United States Patent [19]

Piller

[11] Patent Number: 5,494,428

[45] Date of Patent: Feb. 27, 1996

[54] APPARATUS AND METHOD FOR THE PRODUCTION OF PRETZELS

[76] Inventor: Oswald Piller, Ballaufstr. 5, D-85757 Karlsfeld, Germany

[21] Appl. No.: 343,672

[22] Filed: Nov. 22, 1994

[51] Int. Cl.$^6$ ........................................ A21C 3/08
[52] U.S. Cl. ........................ 425/145; 425/320; 425/323; 425/334; 425/391; 426/500
[58] Field of Search ........................ 425/320, 321, 425/322, 334, 391, 323, 135, 166, 169, 145; 426/500; 99/450.1, 450.2

[56] References Cited

U.S. PATENT DOCUMENTS

| 2,057,772 | 10/1936 | Elliott | 425/323 |
| 5,009,910 | 4/1991 | Zwicker | 425/323 |
| 5,382,154 | 1/1995 | Morikawa et al. | 426/500 |
| 5,440,974 | 8/1995 | Uneo et al. | 425/391 |

FOREIGN PATENT DOCUMENTS

| 3841395 | 5/1990 | Germany . |
| 4242572 | 6/1994 | Germany . |

Primary Examiner—Khanh P. Nguyen
Attorney, Agent, or Firm—O'Connor Cavanagh

[57] ABSTRACT

An apparatus for manufacturing pretzels is provided, which increases production and reduces waste. The apparatus includes a stationary platform onto which strands of dough are deposited. Adjacent to the platform is a conveyor belt with projections that pull the center of the dough strands off the platform in a direction normal to the strands' longitudinal axis. A pair of sensors, preferably mounted on the platform evenly spaced from the centerline of the conveyor belt, detect the ends of the dough strands as they begin to be pulled off the platform. As each sensor detects its corresponding end of the dough strand, a corresponding holding clamp grips that end, thereby centering the dough relative to the conveyor belt. A pair of moveable grippers rotatable about a common central vertical axis are mounted above the conveyor belt to grasp the ends of the dough strand, twist the ends and deposit the ends on the center portion of the dough strand to form a pretzel. By automatically centering the dough strand on the conveyor, the overhead grippers need not adjust their position to compensate for the position of the dough, thereby increasing the speed of operation and reducing the amount of dough wasted.

9 Claims, 3 Drawing Sheets

APPARATUS AND METHOD FOR THE PRODUCTION OF PRETZELS

BACKGROUND OF THE INVENTION

This application is related to German Application No. P. 4336329, filed 25 Oct. 1993.

The present invention pertains to a device for the production of pretzels, in particular a device that is able to twist pretzels from preformed, linear strands of dough in a fully automated fashion for subsequent freezing or conveyance to an oven.

German Patent No. P 3,841,395 discloses a device for preparing pretzels of this type, whereby said device is arranged perpendicular to the transport direction behind a dough shaping device that serves for preparing the strands of dough.

SUMMARY OF THE INVENTION

The present invention comprises a working platform that serves for preparing the pretzels and is provided with devices for detecting the ends of the strand of dough. Stationary grippers or holding clamps are provided to grip the dough ends in response to signals from the detectors. A conveyor is provided having a projection that may be moved nomal to the axis of the dough strand and which may be retracted into the conveyor belt. The projection catches and moves the center of the dough strand laterally to form a U-shaped strand as it pulls the dough off the platform. A holding device is mounted on a robot or other frame above the conveyor. The holding device comprises at least two moveable grippers that may be displaced in the longitudinal direction and which may be rotated about a central axis so as to prepare a raw pretzel by twisting the ends of the strand of dough.

The present invention is able to produce pretzels, which are subsequently either conveyed to a freezer or an oven in fully automated fashion. The arrangement for controlling the position of the ends of the dough strands by insures that the respective strands of dough are taken hold of at the correct locations, displaced and subsequently twisted with one another such that the pretzels may be prepared in fully automated fashion.

The present invention is based on the objective of increasing the number of pretzels that may be prepared per unit time and simultaneously reducing the number of pretzels that were not completely twisted, i.e., reducing waste.

The device according to the invention provides numerous advantages. First, the strand of dough that is supplied to the conveyor belt assumes an exact position relative to the longitudinal axis of the conveyor belt because after one end of a strand of dough passes the corresponding sensor, the sensor transmits a signal that closes the corresponding holding clamp. Thus, the corresponding end of the strand of dough is retained. The second, opposite end of the strand of dough that has not yet passed the sensor is displaced via the projection carried by the conveyor belt until this end also has passed the sensor. Thereafter, the corresponding second holding clamp is closed and this end of the strand of dough is also retained. After having advanced a preset distance, the conveyor belt with the corresponding projection comes to a standstill and the robot arranged above the conveyor belt moves the holding device with the two moveable grippers into the correct position. The moveable grippers are then lowered and grasp the two ends of the strand of dough. The holding clamps are then opened to permit the actual twisting process to be carried out. Since the ends of the strand of dough always assume an exactly identical starting position, the position of the two moveable grippers on the lower side of the holding device no longer need to be adjusted to compensate for position of the ends of the strand of dough. This measure substantially increases the pretzel production speed.

One additional advantage reduces the number of pretzels that are not completely twisted. This is attained by providing two dough-pressing apparatus, comprising pressing elements in the two moveable grippers. Upon the opening of the moveable grippers to deposit the ends of the strand of dough on the center section of the strand of dough underneath, the pressing elements apply a brief pressure on the ends of the strand of dough to produce a secure connection.

BRIEF DESCRIPTION OF THE DRAWINGS

The above and other objects, aspects, features and attendant advantages of the present invention will become apparent from a consideration of the ensuing detailed description of presently preferred embodiments and methods thereof, taken in conjunction with the accompanying drawings, in which.

DESCRIPTION OF PREFERRED EMBODIMENTS AND METHODS

Figure 1:
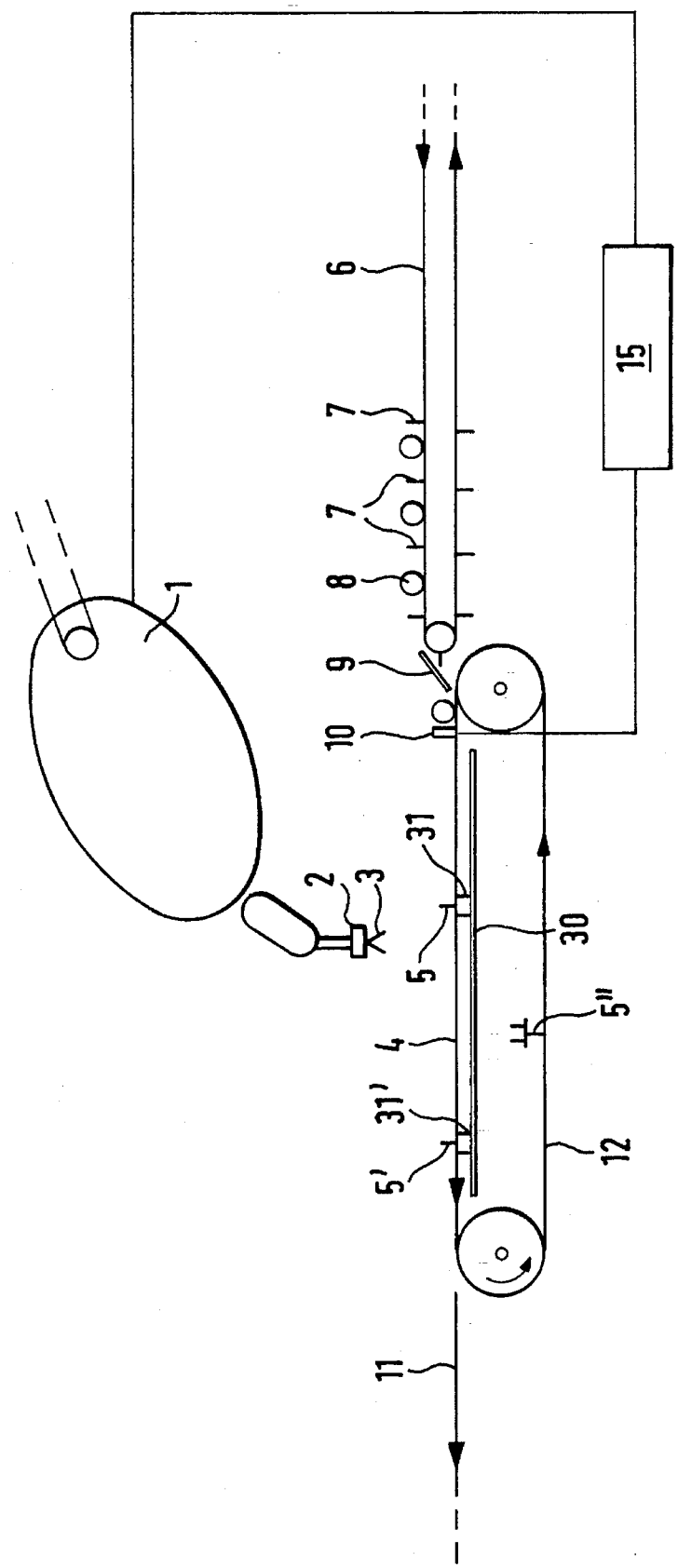
FIG.1 shows a schematic side view of the essential components of the device.

Identical components have the same reference numerals in all figures. In these figures, the reference numeral 1 identifies a conventional robot that may be moved in all directions in space, whereby a holding device 2 that is provided with two moveable grippers 3 on its lower side is arranged on the lower side of the robot. The two moveable grippers are arranged on the holding device 2 such that they may be displaced toward one another as well as away from one another. The holding device 2 may be pivoted about its vertical axis of symmetry, raised and lowered together with the robot, as well as moved into any arbitrary position.

A stationary working platform 4 is adjacent to conveyor belt 12 underneath the robot 1. The upper operating region of the conveyor belt is arranged in a recess in the working platform 4 in such a way that their horizontal surfaces coincide. The conveyor belt is an endless conveyor belt that is looped around two deflection rollers and provided with curved projections 5, 5', 5" that are arranged symmetrically along the longitudinal axis of the belt for pulling the strands of dough into the shape of a U and onto the belt.

The projections 5, 5', 5" penetrate through correspondingly shaped openings in the conveyor belt 12 and are arranged such that they protrude from the conveyor belt 12 within the operating region of the conveyor belt, i.e., in the upper section in FIG. 1, while they are retracted into the conveyor belt within the lower region of said conveyor belt (FIG. 1). This displacement serves for simplifying the transfer of the twisted pretzels from the conveyor belt 12 to a discharge device 11, which may be a slide plate. The lower sides of the individual projections are provided with spring-loaded supports, which act upon the projections in such a way that they retract into the conveyor belt 12, as is the case with the projection 5". A guide rail 30 is provided underneath the upper operating region of the conveyor belt, whereby the supports 31, 31' of the corresponding projections follow the guide rail in such a way that they are pressed out of the conveyor belt 12 in the operating region.

Figure 2:
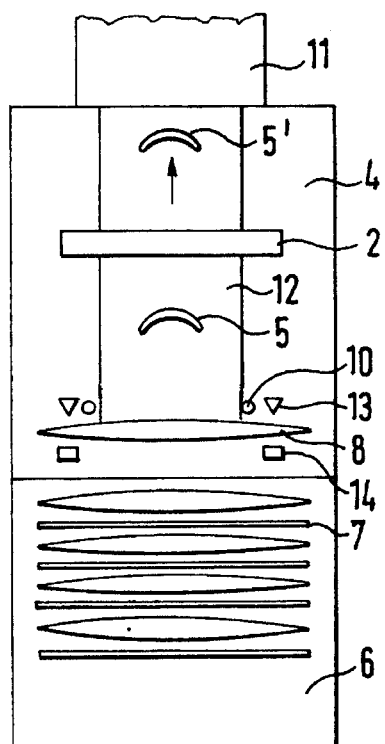
FIGS. 2 through 5, show a schematic top view of the essential components of the device.

A supply device 6, which supplies preformed strands of dough 8, is adjacent to the working platform 4 with the conveyor belt 12. The supply device 6 preferably also is designed in the form of an endless conveyor belt that is moved in the direction of the arrow (FIG. 1) and provided with a number of separating elements 7 that extend perpendicular to the transport direction in order to insure an even distance between the individual strands of dough 8. The reference numeral 9 identifies a transfer device, which may be a slanted plate of polytetrafluoroethylene or special steel, which transfers the individual strands of dough 8 to the working platform 4. FIG. 2 shows the essential components of the device, namely, a schematic top view of the working platform 4, the upper section of the conveyor belt 12, two curved projections 5, 5', part of the discharge device 11, as well as part of the supply device 6. In the position shown in FIG. 2, one strand of dough 8 has just been transferred to the working platform 4.

Figure 9:
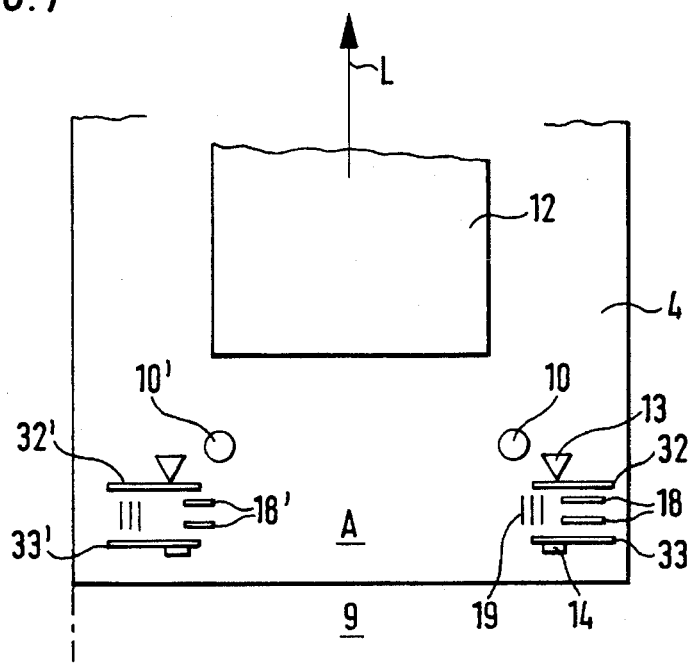
FIG.9, shows an enlarged, schematic top view of a part of the working platform between the transfer point and the conveyor belt.

FIG. 9 shows an enlarged representation of the region situated between the transfer point 9 and the conveyor belt 12 which in the following is designated as the support surface A. In FIG. 9, no strand of dough is drawn on the support surface A in order to provide a better overview. A pair of guide walls 32, 33; 32', 33' for guiding the strand of dough are provided on the support surface A, preferably symmetrical to the longitudinal axis L of the conveyor belt. In order to simplify the sliding movement of the ends of the strand of dough between the guide walls, parallel horizontal rollers 19 are mounted in the floor of the platform. The sensors may be integrated into the guide walls, each sensor consisting of a transmitter 13 and a receiver 14 arranged in the opposite guide wall. These sensors generate a signal after the ends of the strand of dough have passed the sensor. It is possible to utilize other sensors besides optical sensors, such as a mechanically actuated switch 35 (FIG. 5) that is depressed by the weight of the strand of dough and generates a corresponding signal after said strand of dough is conveyed past the switch.

The reference numerals 10, 10' identify two stationary vertical rollers adjacent to the guide walls for facilitating movement of the dough strand past the guide walls. In addition, the reference numerals 18, 18' identify two holding clamps extending upward within the region between guide walls 32 and 33 and between guide walls 32' and 33'. The holding clamps may be arranged between a sensor and the outer edge of the working platform 4, as is the case with the holding clamp that is identified by the reference numeral 18, or between the corresponding sensor and the longitudinal axis L, as is the case with the holding clamp that is identified by the reference numeral 18'.

Figure 3:
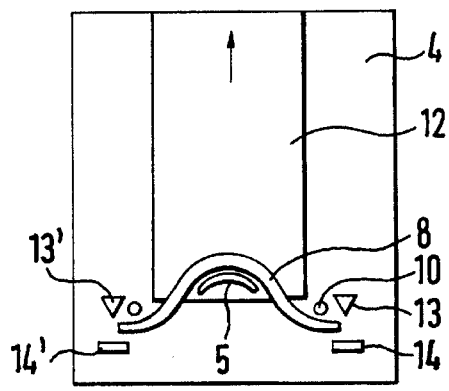
Figure 4:
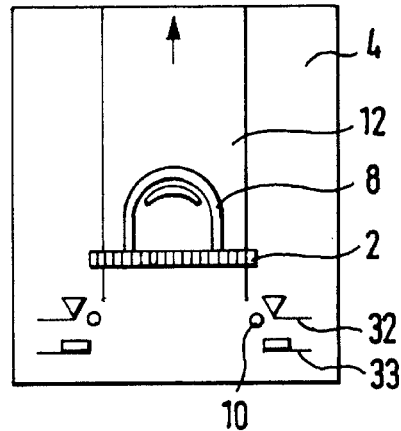

FIG. 3 shows that one of the projections 5 that was raised such that it protrudes out of the surface of the conveyor belt 12 has started to deform the central section of the strand of dough 8 into the shape of a U, so that the two corresponding ends of the strand of dough are pulled out of the guide walls (not illustrated in FIG. 3) and slide past the corresponding sensors and the two vertical rollers. FIG. 3 illustrates the particular condition in which the left end of the strand of dough (viewed from the top) has already passed the sensor that consists of the transmitter 13' and the receiver 14'. This causes the sensor to generate a signal that closes the corresponding holding clamp (not illustrated in FIG. 3), so that the end of the strand of dough is fixed in this position. Due to the additional advance of the curved projection 5, the second, opposite end of the strand of dough slides along between the corresponding guide walls and past the corresponding sensor, whereafter the sensor generates a signal that closes the second, opposite holding clamp to retain the second end of the strand of dough. The advancement of the projection 5 in the meantime has stopped.

In order to reduce unnecessary friction between the curvature 5 and the central section of the strand of dough 8 while one end of the strand of dough is already fixed in position via the corresponding holding clamp, the curved projection 5 may consist of a plurality of freely rotatable rollers that are arranged vertically next to one another and past which the strand of dough slides. Projection 5 may also comprise a curved endless belt that is looped around a plurality of rollers and driven by the strand of dough.

Figure 5:
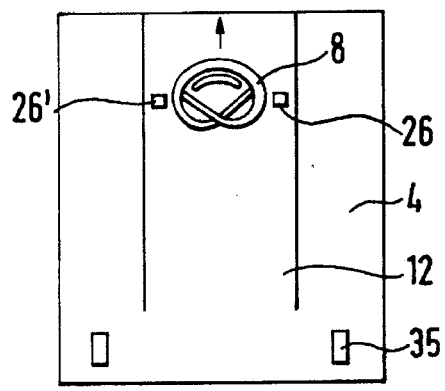
Figure 6:
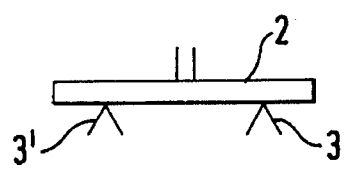
FIG.6, shows a side view of a holding device with the two grippers.

After the two ends of the strand of dough have assumed their predetermined, fixed position on the support surface A, the holding device 2 with the two opened grippers 3 is lowered such that the grippers take hold of the ends of the strand of dough. After opening the holding clamps 18, 18' in FIG. 9, the ends of the strand of dough are raised and twisted to form a raw pretzel, as is indicated in FIG. 5 by rotating the holding device 2 by approximately 360° and depositing the ends back against the center section of the dough strand. The raw pretzel thus formed may be transferred to the discharge device 11 indicated in FIG. 1, by further advancing the conveyor belt 12 and retracting the corresponding projection 5.

The working platform 4 preferably consists of a material with a low coefficient of friction, e.g., special steel or polytetrafluoroethylene, the conveyor belt 12 may be continuous or may consist of a number of individual segments, whereby each segment is provided with a symmetrically arranged, curved projection in its center and the individual segments are connected to one another in an articulated fashion. The previous description makes it clear that the sensors that each consist of a transmitter 13, 13' and a receiver 14, 14' transmit their signals to a control arrangement 15 at different times. The control arrangement triggers the closing movement of the holding clamps 18, 18' at the correct time and controls the lowering of the holding device 2 with the two grippers 3 that always are lowered at exactly the same location, so that an individual adjustment of the grippers 3 as a function of the position of the ends of the strand of dough is unnecessary. This accelerates the operating sequence substantially.

It goes without saying that the proposed device also makes it possible to close both grippers 3 independently of one another after having been lowered, so that one end of the strand of dough may already be taken hold of by the corresponding gripper while the other end has not yet passed the corresponding sensor. The transmitters 13, 13' preferably are infrared transmitters, while the opposite receivers 14, 14' preferably are infrared-sensitive light cells.

Figure 7:
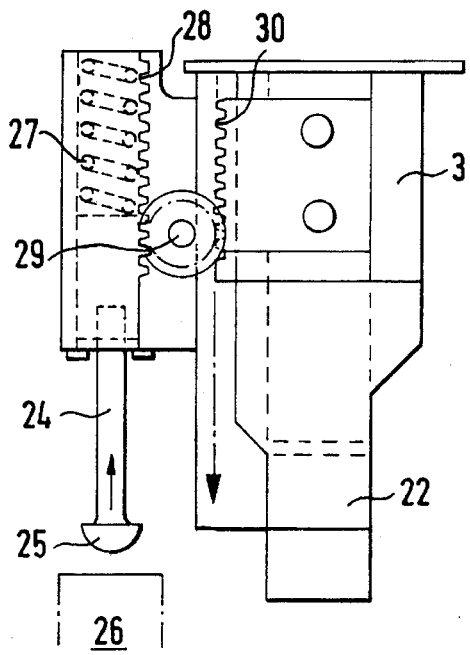
FIGS. 7 and 8, show two views of a gripper with the corresponding pressing elements that are offset to one another by 90°.
Figure 8:
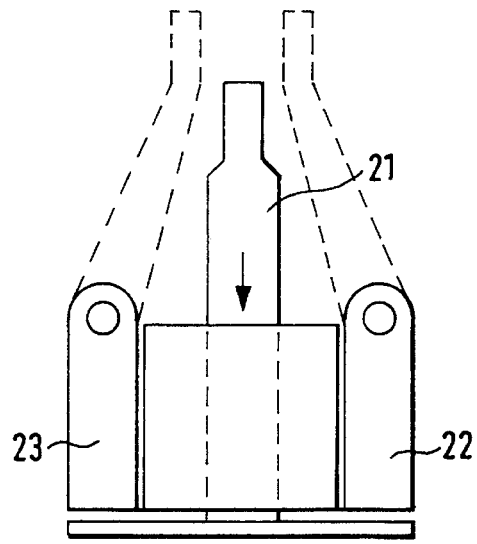

After the strand of dough 8 has been twisted to form the pretzel shown in FIG. 5, both grippers are lowered anew such that the ends of the strand of dough are deposited at the correct positions on the central section of the pretzel. In order to prevent the ends of the strand of dough from adhering to the grippers after opening the grippers, each gripper is provided with a dough-pressing apparatus that presses the end of the strand of dough onto the central section of dough before, during or after opening the gripper 3. FIGS. 7 and 8 show two side views of a gripper 3 that is equipped with a pressing arrangement, whereby each gripper comprises two clamping jaws 22, 23 that are triggered by the control device 15 while being lowered in order to take hold of the ends of the strand of dough before the twisting process and release the same after completing the twisting process.

Each gripper is provided with one pressing element 21 that is arranged in a displaceable fashion on top of and inside of the clamping jaws 22, 23. The lower end of the pressing element 21 may have a smaller diameter than the upper end, whereby the pressing element itself preferably has a circular cross section. The arrow in FIG. 8 indicates the lowering direction of the pressing element along the central axis of the gripper.

The pressing element 21 is preferably actuated in a purely mechanical fashion via a plunger 24 that is arranged parallel to the pressing element but outside of the clamping jaws 22, 23, and may be displaced along its longitudinal axis. The plunger may, for example, be provided with a hemispherical end 25 on its lower side that impinges a mechanical limit stop 26 arranged on the conveyor belt in the vicinity of the particular location at which the end of the strand of dough is pressed onto the central part of the pretzel. As the end of the dough strand is deposited, plunger 24 is raised as the end 25 makes contact with the limit stop 26. The upper part of the plunger 24 is provided with teeth or a toothed rack 28 on its side that faces the pressing element 21, whereby said teeth or toothed rack meshes with a gear 29 that, in turn, engages with teeth or a toothed rack 43 provided on the pressing element 21 at the side that faces the plunger 24. Raising of the plunger 40 actuates the toothed wheel 39 and lowers the pressing element 21 at the same speed. Depending on the adjustment of the control arrangement, pressing element 21 presses the end of the strand of dough onto the central part during, before, or after the opening of the clamping jaws 22, 23. As the moveable clamp is raised, the pressing element is retracted by the force of the spring 27 and the plunger 24 is lowered.

The device for the production of pretzels according to the invention is constructed in a simple and robust fashion, is inexpensive to manufacture, is reliable with respect to its operation, and has a high operating speed, so that more than 1200 pretzels per hour may be twisted into finished pretzels if the strands of dough are supplied continuously.

It is possible to prepare pretzels of different sizes by providing working platforms and conveyor belts of different widths, whereby the sensors, the vertical rollers and the holding clamps as well as the position of the two grippers on the lower side of the rotatable and lowerable holding device must be repositioned when changing from one pretzel size to another.

Although certain preferred embodiments and methods have been disclosed herein, it will be apparent from the foregoing disclosure to those skilled in the art that variations and modifications of such embodiments and methods may be made without departing from the true spirit and scope of the invention. Accordingly, it is intended that the invention shall be limited only to the extent required by the appended claims and the rules and principles of applicable law.

What is claimed is:

1. An apparatus for making pretzels from strands of dough comprising:

a stationary platform for receiving a strand of dough from a delivery device, said platform including a first and second sensor mounted in a spaced apart configuration, said strand of dough being delivered in a predetermined substantially straight configuration onto said platform proximal to said sensors with the ends of said strand of dough laying outward of said sensors;

a conveyor disposed between said sensors, said conveyor being moveable in a direction substantially normal to an axis through said strand of dough, said conveyor further including a projection for pulling substantially the center section of said strand of dough away from said stationary platform;

a first holding clamp responsive to said first sensor for gripping individually a first end of said strand of dough;

a second holding clamp responsive to said second sensor for gripping individually a second end of said strand of dough;

a pair of moveable grippers mounted above said conveyor, said moveable grippers being moveable in a direction toward and away from said conveyor and rotatable about a common vertical axis for lifting the ends of said strand of dough, twisting the ends of said strand of dough about said common axis and depositing said ends onto the center section of said strand of dough to form a pretzel shape; and means for controlling said moveable grippers.

2. The apparatus of claim 1 wherein said controlling means comprises an electronic control arrangement responsive to movement of said conveyor.

3. The apparatus of claim 1 further including a first and second vertical roller, said first vertical roller being mounted inward of and proximal to said first holding clamp, said second vertical roller being mounted inward and proximal to said second holding clamp.

4. The apparatus of claim 1 wherein said first and second sensor each comprises a solid-state transmitter and receiver responsive to the dough end passing from between the sender and receiver.

5. The apparatus of claim 1 wherein said first and second sensor each comprises a mechanical switch mounted underneath said stationary platform and responsive to the weight of said strand of dough.

6. The apparatus of claim 1 wherein said conveyor comprises an endless belt and wherein said projection is extended upward when oriented on the upper surface of said endless belt and is retracted when oriented on the lower surface of said endless belt.

7. The apparatus of claim 1 wherein said moveable grippers each comprise a pair of opposing jaws and further include a dough-pressing apparatus, said dough-pressing apparatus comprising:

a plunger;

means for biasing said plunger downward;

a pressing element mounted between said jaws; and means responsive to upward movement of said plunger relative to said jaws for imparting downward relative motion of said pressing element.

8. The apparatus of claim 7 wherein said biasing means comprises a spring.

9. The apparatus of claim 7 wherein said plunger and said pressing element each further include a rack gear profile at the upper ends thereof, and said imparting means comprises a pinion gear rotatably mounted between said plunger and said pressing element, said pinion gear meshing with said rack gears.

\* \* \* \* \*